July 1, 1958 R. J. WRIGHTON 2,841,030
CONTROL LINE REGULATOR
Filed July 11, 1957 2 Sheets-Sheet 2

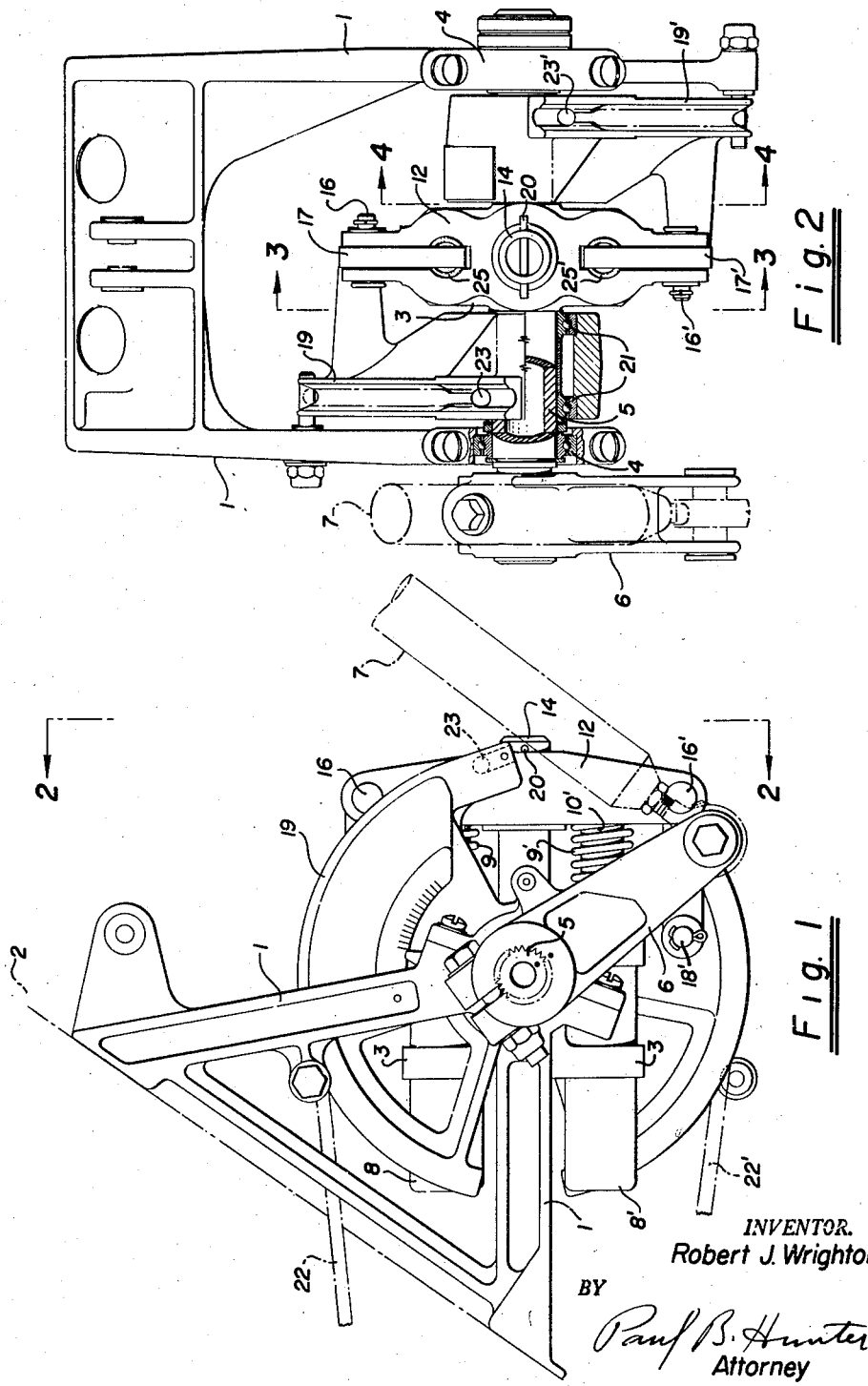

INVENTOR.
Robert J. Wrighton
BY
Paul B. Hunter
Attorney

United States Patent Office 2,841,030
Patented July 1, 1958

2,841,030

CONTROL LINE REGULATOR

Robert J. Wrighton, Tarzana, Calif., assignor to Pacific Scientific Aeroproducts, Glendale, Calif., a corporation of California Application July 11, 1957, Serial No. 671,306

6 Claims. (Cl. 74—501.5)

This invention relates, generally, to control line apparatus, and, more particularly, to a novel control line or tension regulator utilized for maintaining uniform tension in control lines extending between controlling and controlled points, such as where operating a controlled surface such as a rudder, elevator, or aileron of an airplane, from the control stick or steering wheel, the said regulator acting automatically to compensate for variations in the length of the control lines resulting from such conditions as temperature changes, airframe deflection and distortion, etc.

Control line regulators have been used heretofore and consist generally of one or more compression or regulator springs, which exert a tension on the control lines or cables equal to the desired rig load of the cable system, together with an automatically locking mechanism which, although it allows the regulator spring forces to be exerted on the cables so long as the cables are under neutral or balanced forces, i. e., the tensions on the control cables are equal, thereby to maintain the desired rig loading, it nevertheless locks up immediately upon a control force being applied to one of the control cables, thereby preventing further tension regulating movement and transmitting the control force to the controlled point without the controls becoming mushy.

In these control regulators heretofore used it often happens that the control force applied to one of the cables is great enough to cause such cable to stretch somewhat during the period the force is being applied. This causes undesired slack to be produced in the untensioned cable, resulting at times in the fouling of the control lines which these prior art regulators were incapable of preventing.

In co-pending application, Serial Number 562,073 filed on January 30, 1956, Clifford E. Cushman and Robert J. Wrighton, inventors, assigned to the present assignee, there is disclosed certain types of control line regulators having means for taking up any slack that might develop in the untensioned cable during a control operation. The present invention discloses still another form of control line regulator embodying such means.

It, therefore, is the principal object of the present invention to provide a novel, improved control line tension regulator which is fast-acting, dependable in operation, and which maintains the control lines taut at all times.

One feature of the present invention is the provision of a novel control line regulator structure which operates automatically to take up slack in an associated control line during periods when the control line regulator is normally locked against control line tension regulation.

Another feature of the present invention is the provision of a novel spring structure for use in control line regulators for taking up slack in control lines occurring during periods when the regulator is being used to produce a control movement.

Another feature of the present invention is the provision of a control line tension regulator having spring means incorporated therein in addition to the normal tension regulator spring means for taking up slack in control lines during the period when the regulator is normally locked against tension regulation.

These and other features and advantages of the present invention will become more apparent from a perusal of the following specification taken in connection with the accompanying drawings wherein:

Fig. 1 is a view in side elevation showing the novel regulator of the present invention in use;

Fig. 2 is a front view of the structure shown in Fig. 1 taken along the line 2—2 thereof, looking in the direction of the arrows;

Figure 3:
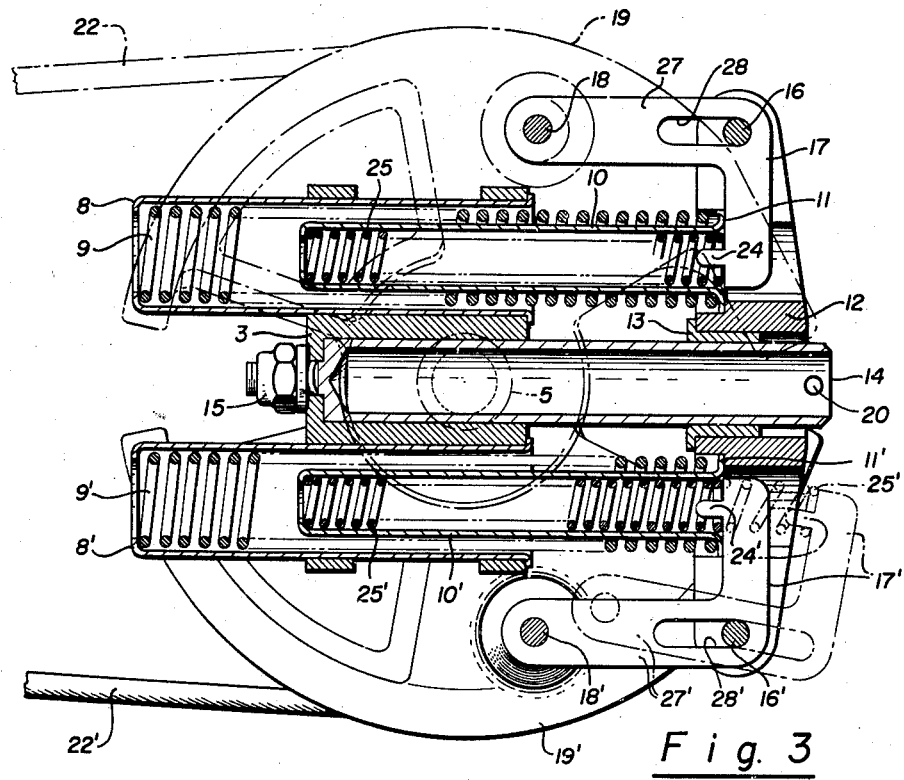
Fig. 3 is an enlarged sectional view taken substantially along the line 3—3 of Fig. 2.
Figure 4:
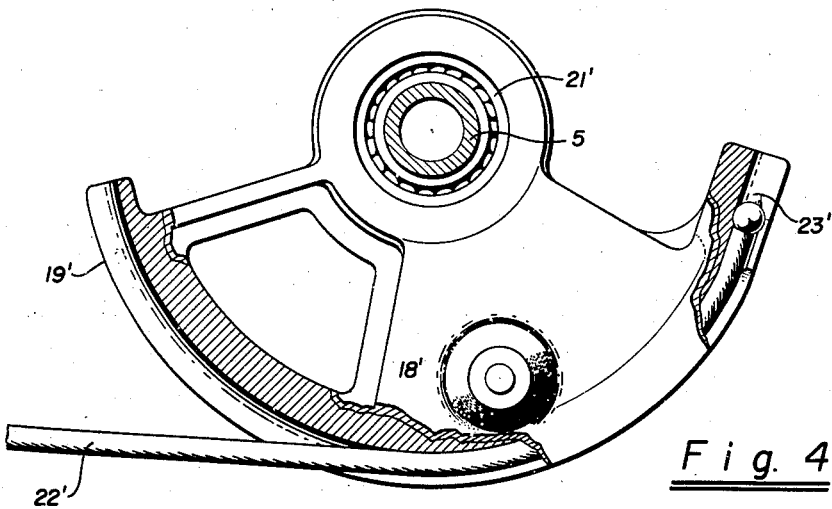
Fig. 4 is a part enlarged sectional view taken along the line 4—4 of Fig. 2.

Referring now to the drawings, the reference numeral 1 designates a supporting bracket which is adapted to be attached, as by screws, to the airframe 2 in a position convenient to the controlled surface. The bracket 1 is approximately U-shaped and receives the regulator body 3 therewithin, the said body having trunnions 5 extending outwardly from the sides thereof which are supported in bearings 4 provided in opposite legs of the bracket 1. Thus, the regulator body 3, together with trunnions 5, is free to turn with respect to the bracket 1. The outer end portion of one trunnion 5 carries an arm 6 fixed thereon, which arm has its outer end coupled to one end of link 7, the other end of which is adapted to be connected to a horn on the desired control surface for actuating the latter. The regulator body 3 (see especially Fig. 3) is apertured to receive and carries regulator spring supporting outer sleeve members 8 and 8' positioned on opposite sides of the trunnions 5.

Regulator compression sprinngs 9 and 9' are carried by the sleeve members 8 and 8', the outer ends of these regulator springs pressing against the flanged outer ends 11 and 11' of inner sleeve members 10 and 10' which pass within the springs 9 and 9'. The flanges 11 and 11' are positioned within stepped cylindrical recesses provided in a rocker lock arm 12 that has its central hub portion apertured and provided with a lock bushing 13 for sliding upon a hollow lock shaft 14 which extends into a conforming cylindrical recess provided in the regulator body 3 and is retained therein as by nut 15 threaded upon a reduced extension of the shaft 14 and abutting the exterior surface of the body 3. The rocker lock arm 12 has bifurcated outer ends carrying pins 16 and 16' upon which are pivoted bellcrank levers 17 and 17'. The rocker lock arm 12 and bellcrank levers 17 and 17' serve as force transmitting means for transferring the force of springs 9 and 9' to sheave sectors 19 and 19'.

The levers 17 and 17' are pivotally connected respectively by means of pins 18 and 18' to spaced sheave sectors 19 and 19', which sectors are turnably mounted upon the trunnions 5 by means of bearings 21, 21'. Sectors 19 and 19' are adapted to have control cables 22 and 22' pass thereover with the forward ends of these cables attached to the sheave sectors at points 23 and 23'. The ends of bellcrank levers 17 and 17' remote from pivotal pins 18 and 18' are provided with centering bosses 24 and 24' which project into the outer ends of slack take-up springs 25 and 25' contained within the inner sleeve members 10 and 10'. The springs 25 and 25' press at their inner ends upon the inner ends of sleeves 10 and 10', and at their outer ends these springs press against bellcrank levers 17 and 17'.

In use, during the normal period when a control load is not being applied to the system, the regulator compression springs 9 and 9' press outwardly against the rocker lock arm 12, tending to move this arm to the right as viewed in Figs. 1 and 3, so that the bushing 13 slides along the shaft 14 maintaining the desired rig load upon the cables 22 and 22'. A pin 20 limits the movement of arm 12 to the right. During this motion of the rocker lock arm 12 under the action of the springs 9 and 9', the longitudinally extending arms 27 and 27' of bellcrank levers 17 and 17' act as links or linkage transmitting tension from pins 16 and 16' to pins 18 and 18', tending to cause sector 19 to move clockwise as viewed in Fig. 3 and sector 19' to move counter-clockwise as viewed in Fig. 3, whereby the cables 22 and 22' are maintained under the desired rig load. As these cables tend to lengthen and shorten due to temperature changes, airframe flexure, etc., the springs 9 and 9' automatically yield and expand as the case may be to keep the cables 22 and 22' under substantially uniform rig load at all times.

As soon as a control movement is applied to the cables, for example, should cable 22 be pulled to the left as viewed in Figs. 1 and 3 due to operation of the joystick or steering wheel, this cable will carry more tension than cable 22', with the result that the stress in link 27 will be greater than that in 27', resulting in the canting or slight rocking of the rocker lock arm 12 counter-clockwise as viewed in Fig. 3, thereby locking bushing 13 upon shaft 14 and preventing any further tension regulator compression or expansion of springs 9 and 9' while locking the system so that the sheave sectors 19 and 19' will turn together as a unit and effect rotation of body 3, and hence of trunnions 5, thereby actuating arm 6 and the control surface through movement of link 7. However, as the tension on cable 22 increases, particularly where there is considerable resistance to movement by the controlled surface, the cable 22' will tend to be slack and this is highly objectionable because it may result in this cable falling off its supporting sheaves and result in fouling of the system. To prevent this, the slack take-up spring 25' acts to turn bellcrank lever 17' clockwise as viewed in Fig. 3, thereby moving sheave sector 19' to take up any slack that may have developed in cable 22'. To accommodate this movement, bellcrank lever 17' is slotted in arm 27' at 28' and likewise bellcrank lever 17 is slotted in arm 27 at 28. Under the action of slack take-up spring 25', bellcrank lever 17 not only turns clockwise but also slides outwardly on pin 16', as shown in dot-dash lines in Fig. 3, to accommodate the counter-clockwise movement of sheave sector 19'. Thus, this sector is turned under the action of spring 25' as fast as any slack tends to develop in cable 22', thereby to take up this slack. It is important that the slack take-up springs 25 and 25' be weaker than regulator springs 9 and 9'. Similarly, if the control movement results in the tensioning of cable 22' and the slackening of cable 22, slack take-up spring 25 will operate through bellcrank lever 17 to turn sector 19 clockwise to maintain cable 22 in taut condition.

Thus, it will be seen that the cables are maintained taut at all times even during control operations so that dangerous slack cannot develop.

Since many changes could be made in the above construction of the control line regulator and many apparently widely different embodiments of this invention could be made without departing from the scope thereof, it is intended that all matter contained in the above description or shown in the accompanying drawings shall be interpreted as illustative and not in a limiting sense.

What is claimed is:

1. A control line regulator comprising a regulator body, a pair of oppositely disposed sheave sectors carried by said body and relatively turnable about a common axis, said sheave sectors being adapted to receive control cables, regulator spring means carried by said regulator body, force transmitting means connecting said spring means and said sheave sectors for urging the latter to turn in opposite directions to maintain the cables under rig tension, said force transmitting means serving to effect the locking of said sheave sectors against relative turning movement when a control load is applied to one of the cables connected to one of said sheave sectors, and slack take-up spring means carried by said regulator body and also acting through the force transmitting means to cause the other sheave sector to take up any slack developed in the unloaded cable.

2. A control line regulator as defined in claim 1, wherein said force transmitting means between the regulator spring means and the sheave sectors comprises a pair of bellcrank levers and a rocker lock arm carrying said bellcrank levers, each of said bellcrank levers having one end connected to a respective one of said sheave sectors and its other end engaged by said slack take-up spring means.

3. A control line regulator as defined in claim 2 having a lock shaft carried by said regulator body upon which said rocker lock arm is normally slidable during regulating action of said regulator.

4. A control line regulator comprising a regulator body adapted to be connected for actuating a controlled member, a lock shaft carried by said body, a rocker lock arm normally slidable along said lock shaft, regulator springs interposed between said body and said rocker lock arm, sector sheaves turnable on said body, linkage interconnecting said rocker lock arm and said sector sheaves for transmitting the force of said regulator springs to said sector sheaves, and slack take-up springs carried by said body and also connected through said linkage to said sheave sectors.

5. A control line regulator as defined in claim 4 wherein said linkage comprises bellcrank levers pivoted on said rocker lock arm and having one of their arms engaged by a respective one of said slack take-up springs and the other of their arms pivotally connected to a respective one of said sector sheaves.

6. A control line regulator as defined in claim 5 wherein said bellcrank levers are slotted at their connections with said rocker lock arm to enable actuation of said sector sheaves by said slack take-up springs.

No references cited.